Patented Mar. 18, 1941

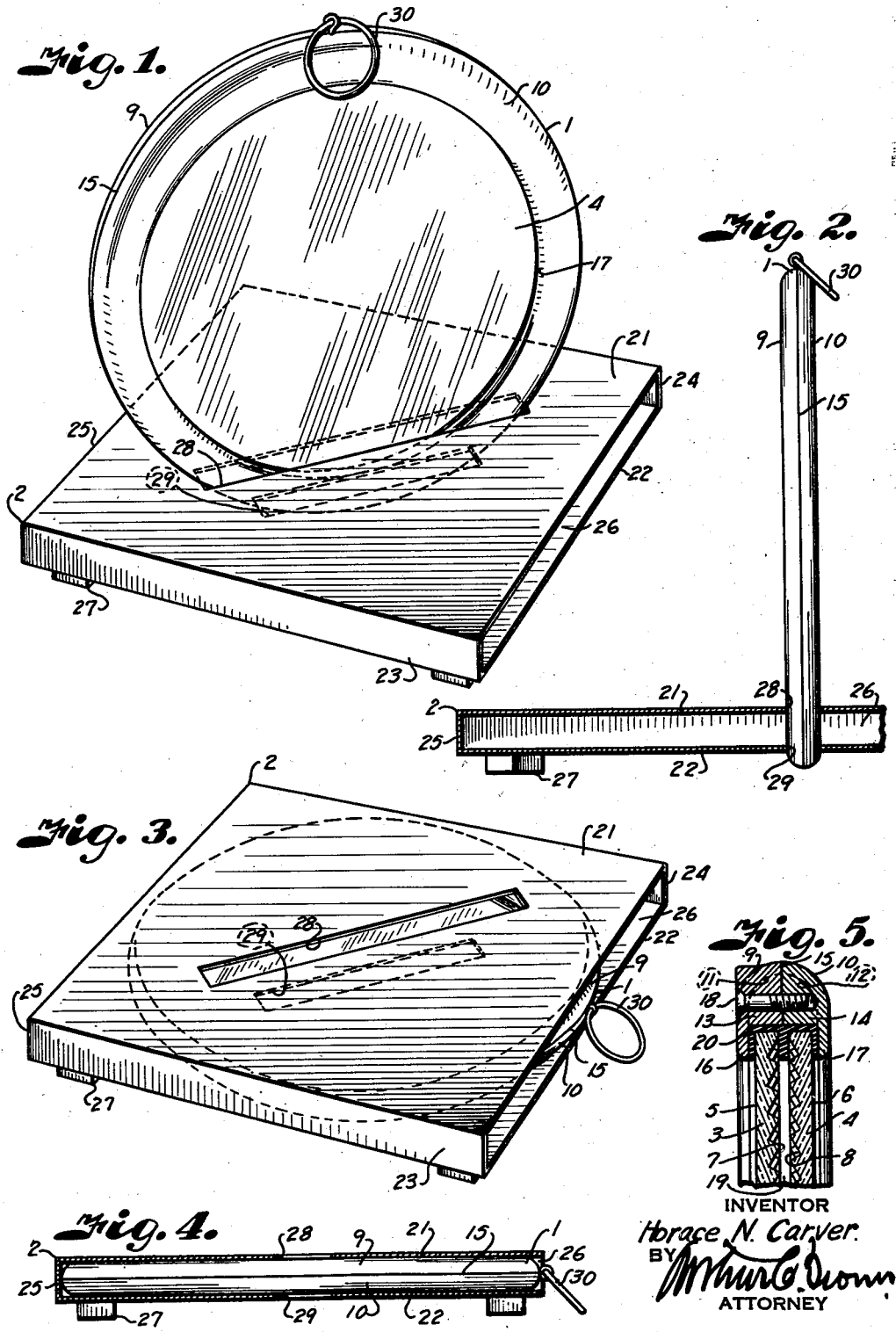

2,235,283

UNITED STATES PATENT OFFICE 2,235,283

SIGNALING DEVICE

Horace N. Carver, Wichita, Kans.

Application April 21, 1938, Serial No. 203,346

3 Claims. (Cl. 88—78)

This invention relates to signaling devices and more particularly to a portable signal adapted to be conveniently placed on highways and similar thoroughfares for warning motorists and the like of obstructions on a highway.

It is ordinarily difficult for operators of vehicles such as loaded trucks to pull off the road when it becomes necessary to make repairs on the vehicles under their control. Should the motor of a truck fail or the tires need changing, the stalled or otherwise stationary vehicle creates a hazard on the road, not only to approaching motorists, but also to the truck operators and the property under their control.

It is the principal object of the present invention to provide a signal of the character commonly known as a "road flare" which is capable of reflecting and/or refracting light rays generated by the lights of approaching vehicles back approximate their source to warn the occupants of those vehicles of the presence of obstructions on roads.

Other important objects of the present invention are to provide a collapsible light reflecting and/or refracting signal of sturdy and durable construction capable of withstanding shocks and jars without damage to the signal; to so design the signal that it is difficult to tip over accidentally; to provide a compact and easily operable signal having a high degree of efficiency; to provide a protective mounting for the reflector or light refracting element of the signal; to provide a housing for the signaling element adapted to slidably receive said element and protectively enclose the same; to arrange the housing relative to the signaling element in such a manner that the housing acts as a support for the signaling element when in operative condition; to adapt the signaling element both for suspension in hanging and support in upright operable positions; and to provide improved parts and arrangements of parts making up a signaling device of this character.

In accomplishing these and other objects of the present invention, I have provided improved details of structure, the preferred form of which is illustrated in the accompanying drawing wherein:

Fig. 1 is a perspective view of a signaling device embodying the features of the present invention, the device being shown in operative condition.

Fig. 2 is an end elevational view of the signaling element, the housing support therefor being shown in cross-section to particularly illustrate the manner of mounting the signaling element thereon.

Fig. 3 is a perspective view of the signaling device in collapsed condition arranged for storage.

Fig. 4 is a side elevational view of the device in collapsed condition, the housing therefor being shown in longitudinal cross-section to illustrate the manner of housing the signaling element.

Fig 5 is a detail vertical cross-section through a portion of the signaling element particularly illustrating the preferred construction thereof.

Referring more in detail to the drawing:

The invention generally includes a signaling element 1 capable of reflecting and refracting light rays in opposite directions back approximate their sources of incidence and a housing 2 for the signaling element adapted to enclose the same when in inoperative position and support the same in operative position when the signaling element is in use.

More particularly, the signaling element 1 preferably comprises oppositely disposed plates 3 and 4, Fig. 5, each preferably formed of colored rolled glass or similar substantially transparent material having suitable outer faces 5 and 6 and preferably prismatic inner faces 7 and 8. The peripheral edges of the signal plates 3 and 4 are preferably mounted within mating frame members 9 and 10 which are preferably of substantially circular or ring-shape of any suitable size. The frames preferably have concaved inner surfaces indicated by the dotted lines 11 and 12 which surfaces are provided with spaced alignable bosses, a cross-section of which is indicated at 13 and 14. The bosses 13 and 14 extend to the joining edge 15 of the frames in such a manner that they are adapted for engagement with each other. The bosses terminate short of the inner edges 16 and 17 of the frame members to form seats for the peripheral edges of the signal plates 3 and 4, the outer side edges of the plates being arranged for engagement by the inside edges of the frame members. Suitable fastening devices 18 are provided for extension through aligned apertures in the frames and bosses thereof for securing the frame members together and clamping the signaling plates therebetween.

As shown in Fig. 5, the signal plates 3 and 4 are spaced from each other as indicated at 19 and a preferably E-shaped gasket 20 of sponge rubber or similar material is interposed between the plates and frame members in such a manner as to cushion the signal plates relative to their supporting frames, thus permitting relatively rough treatment of the device as a whole without danger of breaking the signaling plates.

It is believed apparent that the provision for separating the signal plates works an advantage in that if one of the signal plates is broken, the other may still be used, the gasket 20 acting to hold the unbroken signal plate in its frame in such a manner that the signaling device may be employed to warn approaching motorists from at least one direction.

The housing 2 preferably comprises a box-like structure having top and bottom walls 21 and 22, side walls 23 and 24, and an end wall 25, the walls forming a recess 26 of a size and shape suitable for slidably mounting the signaling element 1 therein. Bearing bosses 27 are preferably provided in spaced relation on the under face of the bottom wall 22 for frictionally engaging a support to maintain the housing in desired position.

The top and bottom walls of the housing are provided with openings, such as slots 28 and 29, for receiving and seating a portion of the signaling element to anchor the signaling element in operative condition. Where the signaling element is of circular or disc-like shape, as shown, the slots 28 and 29 are of different length, the slot 28 in the top wall being longer than the slot 29 in the bottom wall to the end that the portion of the bottom wall bounding the slot 29 is adapted for engagement with a portion of the signaling element, and the top wall bounding the slot 28 is adapted for engagement with a wider or more extensive surface of the disc-like signaling element, the housing member thus acting to provide a secure seat over an area of the signaling element adequate for supporting the same in upright condition.

The signaling element is also preferably provided with a handle member 30 to facilitate withdrawal of the signaling element from the housing as well as to control insertion thereof into the housing. The handle 30 also provides means for suspending the signaling element from an elevated support such as a hook, rod or the like on a stalled vehicle should it be desired not to use the signaling device on the ground.

The operation of the signaling device is believed apparent in that, when not in use, the signaling element has sliding fit within the housing and, when to be used, the handle 30 of the signaling element is grasped to draw the same from the housing, and a portion of the periphery thereof is thereupon inserted into the slots 28 and 29 of the housing for supporting the signaling element in erected operative position. The signaling element is, of course, preferably placed at substantially right angles to approaching traffic on the road so that light rays from the lights of approaching vehicles may impinge against the signaling plates thereof and be refracted and reflected back approximate their sources of incidence to warn occupants of the vehicles of the presence of obstructions on the road.

The principal advantages of a signaling device embodying the features of the present invention are that it is strong, rigid, durable, economic in construction, and will withstand rough treatment. Furthermore, it is compact, easily operable, may be stored in any type of vehicle and, should one of the signal plates be broken, the other plate is still effective to warn approaching motorists from one direction.

What I claim and desire to secure by Letters Patent is:

1. In a road signal of the character described, a housing adapted to carry a signaling element, the housing consisting of top, bottom and side walls and an end wall, the other end of the housing being open to allow removable mounting of the signaling element within the housing, the side walls of the housing being of less height than the width of the housing, and the top wall of the housing having an elongated opening of approximately the width of the thickness of the signaling element to seat and temporarily retain a portion of the signaling element in the housing for operatively positioning the same.

2. In a road signal of the character described, a housing adapted to carry a signaling element, the housing consisting of top, bottom and side walls and an end wall, the other end of the housing being open to allow removable mounting of the signaling element within the housing, the side walls of the housing being of less height than the width of the housing, the top wall of the housing having an elongated opening of approximately the width of the thickness of the signaling element to seat and temporarily retain a portion of the signaling element in the housing for operatively positioning the same, and the bottom wall of the housing having an opening aligned with the opening in the top wall for seating and temporarily retaining a portion of the signaling element spaced below the top wall of the housing to aid in anchoring the signaling element in operative condition.

3. In a road signal of the character described, a housing adapted to carry a signaling element, the housing consisting of top, bottom and side walls and an end wall, the other end of the housing being open to allow removable mounting of the signaling element within the housing, the side walls of the housing being of less height than the width of the housing, the top wall of the housing having an elongated opening of approximately the width of the thickness of the signaling element to seat and temporarily retain a portion of the signaling element in the housing for operatively positioning the same, the bottom wall of the housing having an opening aligned with the opening in the top wall of approximately the width of the first named opening and of less length, whereby a signaling element having a curved periphery may be operatively positioned in substantially exteriorly supported position relative to said housing by said housing.

HORACE N. CARVER.